United States Patent Office 3,126,402
Patented Mar. 24, 1964

3,126,402
(10-PHENOXARSINYLTHIO)AMINES
Stanley J. Strycker, Midland, Mich., assignor to The Dow Chemical Company, Midland, Mich., a corporation of Delaware
No Drawing. Filed Sept. 4, 1962, Ser. No. 221,320
9 Claims. (Cl. 260—440)

The present invention is directed to the (10-phenoxarsinylthio)amines having the formula

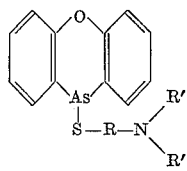

wherein R is a divalent radical selected from the group consisting of alkylene being of from 2 to 12 carbon atoms, alkenylene being of from 4 to 12 carbon atoms, phenylene, and substituted phenylene wherein each substituent is independently selected from the group consisting of alkyl, alkoxy, alkylthio, amino, or halo, and wherein each R' is independently selected from the group consisting of hydrogen and lower alkyl being of from 1 to 4 carbon atoms, and is further directed to the salts thereof with strong acids. In the present specification and claims, the terms "alkyl," "alkoxy," and "alkylthio" refer to radicals being of from 1 to 4, inclusive, carbon atoms, and the term "halo" is inclusive of bromo and chloro only.

The compounds of the present invention are solid materials of low solubility in various organic solvents such as benzene, hexane, dichloromethane, and ethyl acetate, and of varying solubility in water; that is, those products of the present invention which are free amines are of low solubility in water and those products which are salts, of moderate solubility in water.

The term "alkylene" is utilized to describe a saturated hydrocarbon radical having two valence bonds of which each attaches to a separate moiety in the entire compound. The term "alkenylene" is utilized to describe a divalent radical differing from a respective alkylene radical only in that it is internally unsaturated; that is, a given alkenylene radical has one double bond, which double bond is not present in the respective alkylene radical. As employed in the present specification and claims, the term alkenylene is restricted to alkenylene radicals having a double bond between two carbon atoms of which neither is attached to the amine or the sulfur.

The preferred strong acids are sulfuric acid; the lower alkanoic acids, such as formic acid, acetic acid, propionic acid, and butyric acid; the haloloweralkanoic acids, such as bromoacetic acid, chloroacetic acid, dibromoacetic acid, dichloroacetic acid, tribromoacetic acid, trichloroacetic acid, 2-bromopropionic acid, 2-chloropropionic acid, 2,2-dibromopropionic acid, 2,2-dichloropropionic acid, 2-bromobutyric acid, 2-chlorobutyric acid, 2,2-dibromobutyric acid, 2,2-dichlorobutyric acid; the loweralkanesulfonic acids, such as methanesulfonic acid, ethanesulfonic acid, 1-propanesulfonic acid, 1-butanesulfonic acid, 1-pentanesulfonic acid, and 1-hexanesulfonic acid; the hydrohalic acids, such as hydrobromic acid and hydrochloric acid; and benzenesulfonic acid.

In keeping with the practice of Chemical Abstracts certain of the salts are named in the present specification and claims as compounds of the amines with the respective acids. In addition, the combining ratio of the amines and acids are specified.

The products of the present invention can be prepared by reacting together a mercapto amine having the formula

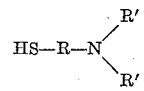

or a strong acid salt thereof with 10,10'-oxybisphenoxarsine. Conveniently, the reaction is carried out in an inert liquid reaction medium, which can be a non-polar solvent, for example, hexane, cyclohexane, toluene, benzene or chloroform. Additionally those products of the present invention which are salts of (10-phenoxarsinylthio)amines can be prepared, and are preferably prepared, in a polar solvent such as water, methanol, ethanol, and the like. The starting materials are consumed in the proportion of one mole of 10,10'-oxybisphenoxarsine and two moles of the mercapto amine or mercapto amine salt; and, efficiently, starting materials can be supplied in these proportions. However, the amounts of the reactants to be employed are not critical, some of the desired product being obtained when employing any proportion of the reactants. The reaction takes place smoothly at temperatures of from approximately 20° to approximately 100° C., with production of the compound of the present invention together with water of reaction.

In carrying out the reaction, the reactants are mixed and contacted together in any convenient fashion and the resulting mixture maintained for a period of time in the reaction temperature range to complete the reaction. Upon completion of the reaction, the desired product can be separated in various manners. In one such operation, the water of reaction is removed from the reaction mixture by evaporation to dry the reaction mixture and the solvent removed from the dry reaction mixture. If desired, the reaction medium may be partially removed by vaporization and cooling, to obtain a satisfactory product precipitate. This precipitate can be removed by filtration to obtain the desired product as a residue. Also, water of reaction or as solvent can be removed by azeotropic distillation, instead of or in addition to the procedures described, foregoing. The product can thereafter be purified as, for example, by recrystallization from ethanol, water or the like.

The following examples illustrate the invention but are not to be considered as limiting it.

Example I.—o-(10-Phenoxarsinylthio)Aniline

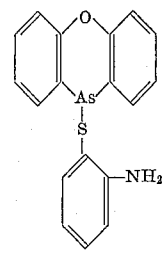

25.1 grams of 10,10'-oxybisphenoxarsine (0.05 mole) and 1200 milliliters of ethanol are mixed together with stirring; to the resulting mixture is added rapidly portionwise and with stirring 13.8 grams of o-mercaptoaniline (0.11 mole). The addition is carried out at room temperature. After completion of the addition, the reaction mixture is heated to a temperature of about 80° C. for about an hour. Thereafter, the reaction mixture is permitted to cool, whereupon the product precipitates in the resulting cooled reaction mixture. The cooled mixture is filtered to obtain the o-(10-phenoxarsinylthio)aniline product as a crystalline residue. This product is found to melt at from 121° to 124° C.

*Example II.—2-(10-Phenoxarsinylthio)Ethylamine Hydrochloride*

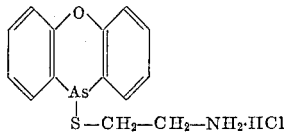

S—CH₂—CH₂—NH₂·HCl 25.1 grams of 10,10'-oxybisphenoxarsine (0.05 mole) and 250 milliliters of water are mixed together. To the resulting mixture is added rapidly portionwise and with stirring, 12.4 grams (0.11 mole) of 2-mercaptoethylamine hydrochloride. The addition is carried out at room temperature. The reaction mixture is thereafter heated to a temperature of about 100° C. for thirty minutes to complete the reaction and subsequently cooled to room temperature whereupon product precipitates in the resulting cooled mixture. The cooled mixture is filtered to obtain the 2-(10-phenoxarsinylthio)ethylamine hydrochloride product as a crystalline material melting at from 207° to 210° C.

In similar manner, the other products of the present invention are prepared. Representative such compounds include:

6-tert-butyl-N-methyl-4-(10-phenoxarsinylthio)-m-toluidine hydrochloride (molecular weight of 487.9), by reacting together 6-tert-butyl-N-methyl-4-mercapto-m-toluidine hydrochloride and 10,10'-oxybisphenoxarsine.

N-butyl-N-methyl-12-(10-phenoxarsinylthio) - dodecylamine (molecular weight of 529.7), by reacting together N-butyl-N-methyl-12-mercaptododecylamine and 10,10'-oxybisphenoxarsine.

2,7-dimethyl-8-(10-phenoxarsinylthio) - 4-octenylamine (molecular weight of 429.5), by reacting together 2,7-dimethyl-8-mercapto-4-octenylamine and 10,10'-oxybisphenoxarsine.

2-(10 - phenoxarsinylthio)triethylamine hydrochloride (melting at from 154° to 159° C.) by reacting together 2-mercaptotriethylamine hydrochloride and 10,10'-oxybisphenoxarsine.

2,3,5,6-tetrachloro-N-ethyl - 4 - (10-phenoxarsinylthio)-aniline, compound (1–1) with chloroacetic acid (molecular weight of 627.6), by reacting together 2,3,5,6-tetrachloro-N-ethyl-4-mercaptoaniline, compound (1–1) with chloroacetic acid, and 10,10'-oxybisphenoxarsine.

N-isopropyl-4,5-bis(methylthio)-2 - (10-phenoxarsinylthio)aniline (having a molecular weight of 501.6) by reacting together N-isopropyl-4,5-bis(methylthio)-2-mercaptoaniline and 10,10'-oxybisphenoxarsine.

9-(10-phenoxarsinylthio)nonylamine, compound (2–1) with sulfuric acid (molecular weight of 933.0), by reacting together 9-mercaptononylamine, compound (2–1) with sulfuric acid, and 10,10'-oxybisphenoxarsine.

5-(10-phenoxarsinylthio)-m-phenylenediamine (having a molecular weight of 382.3), by reacting together 5-mercapto-m-phenylenediamine and 10,10'-oxybisphenoxarsine.

N,N,1-trimethyl-2-(10-phenoxarsinylthio)propylamine, compound (1–1) with methanesulfonic acid (molecular weight of 471.5), by reacting together N,N,1-trimethyl-2-mercaptopropylamine, compound (1–1) with methanesulfonic acid, and 10,10'-oxybisphenoxarsine.

N-butyl-N-isopropyl)- 4 - (10-phenoxarsinylthio)-2-butenylamine (molecular weight of 443.5), by reacting together N-butyl-N-isopropyl-4-mercapto-2-butenylamine and 10,10'-oxybisphenoxarsine.

N-methyl-m-(10-phenoxarsinylthio)aniline, compound (1–1) with 2-bromopropionic acid (having a molecular weight of 534.4), by reacting together N-methyl-m-mercaptoaniline, compound (1–1) with 2-bromopropionic acid, and 10,10'-oxybisphenoxarsine.

5-bromo-N,2-diethyl - 4 - (10-phenoxarsinylthio)aniline hydrochloride (molecular weight of 538.8), by reacting together 5-bromo-N,2-diethyl-4-mercaptoaniline hydrochloride and 10,10'-oxybisphenoxarsine.

p-(10-phenoxarsinylthio)aniline hydrochloride (melting at from 182 to 185° C.), by reacting together p-mercaptoaniline hydrochloride and 10,10'-oxybisphenoxarsine.

1-((10-phenoxarsinylthio)methyl)heptylamine (having a molecular weight of 403.4), by reacting together 1-(mercaptomethyl)heptylamine and 10,10'-oxybisphenoxarsine.

N,2,3-trimethyl - 4 - (10-phenoxarsinylthio)-2-butenylamine (molecular weight of 373.3), by reacting together N,2,3-trimethyl-4-mercapto-2-butenylamine and 10,10'-oxybisphenoxarsine.

N-(1-methyl - 2 - (10 - phenoxarsinylthio)ethyl)propylamine (molecular weight of 375.4), by reacting together N-(1-methyl-2-mercaptoethyl)propylamine and 10,10'-oxybisphenoxarsine.

N-sec-butyl-2,5-dimethoxy- 4 - (10-phenoxarsinylthio)-aniline hydrobromide (molecular weight of 564.4), by reacting together N-sec-butyl-2,5-dimethoxy-4-mercaptoaniline hydrobromide and 10,10'-oxybisphenoxarsine.

5-(10-phenoxarsinylthio)pentylamine, compound (1–1) with sulfuric acid (molecular weight of 459.4), by reacting together 5-mercaptopentylamine, compound (1–1) with sulfuric acid, and 10,10'-oxybisphenoxarsine.

5-butoxy-N,N-dibutyl-2-(butylthio)-4-(10-phenoxarsinylthio)aniline (molecular weight of 639.8), by reacting together 5-butoxy-N,N-dibutyl-2-(butylthio)-4-mercaptoaniline and 10,10'-oxybisphenoxarsine.

N-isopropyl-4-(10-phenoxarsinylthio) - 2 - butenylamine, compound (1–1) with 1-butanesulfonic acid (molecular weight of 525.6), by reacting together N-isopropyl-4-mercapto-2-butenylamine, compound (1–1) with 1-butanesulfonic acid, and 10,10'-oxybisphenoxarsine.

N-methyl-9-(10-phenoxarsinylthio)nonylamine hydrobromide (molecular weight of 540.5), by reacting together N-methyl-9-mercaptononylamine hydrobromide and 10,10'-oxybisphenoxarsine.

4-(10-phenoxarsinylthio)-2,5-xylidine, compound (1–1) with 2-chlorobutyric acid (molecular weight of 517.9), by reacting together 4-mercapto-2,5-xylidine, compound (1–1) with 2-chlorobutyric acid, and 10,10'-oxybisphenoxarsine.

2,3-dichloro-N-ethyl - 6 - (10-phenoxarsinylthio)aniline (molecular weight of 463.4), by reacting together 2,3-dichloro-N-ethyl-6-mercaptoaniline and 10,10'-oxybisphenoxarsine.

3-(10-phenoxarsinylthio)propylamine, compound with 1-hexanesulfonic acid (molecular weight of 499.5), by reacting together 3-mercaptopropylamine, compound (1–1) with 1-hexanesulfonic acid, and 10,10'-oxybisphenoxarsine.

The new compounds of the present invention are useful as herbicides and parasiticides for the control of a number of plant, helminth, mite, insect, bacterial, and fungal organisms. For such use, the products can be dispersed on a finely divided adjuvant solid and employed as dusts. Also, such resulting mixtures can be dispersed in water with the aid of a wetting agent and the further resulting aqueous suspension employed as sprays. In other procedures the products can be employed as constituents of organic liquids, oil-in-water or water-in-oil emulsions, or water dispersions with or without the addition of wetting, dispersing or emulsifying agents. In representative operations, the application of an aqueous composition containing 500 parts of either o-(10-phenoxarsinylthio)aniline or 2-(10-phenoxarsinylthio)ethylamine hydrochloride per million parts by weight of ultimate composition to young bean plants having a known infestation of southern army worm (*Prodenia eridania*) larvae gives 100 percent control of said larvae.

Certain of the starting mercapto amine compounds employed in the present invention are articles of commerce. Those which are not are prepared in known procedures. Probably the most convenient is the method of Gilman et al., as set forth in the Journal of the American Chemical Society, volume 67 (1945), page 1845 and following. Whereas their work was restricted to certain Ω-mercaptoethyl tertiaryamines, the method is readily adapted to the preparation of the higher homologues as used in the present invention as well as Ω-mercaptoalkyl primary- and secondaryamines, and Ω-mercaptoalkenyl primary-, secondary-, and tertiaryamines, by the employment of the appropriate halide compounds. These are readily prepared in the manner in which Gilman and his co-workers prepared the β-diethylaminoethyl chloride, as set forth by Gough and King, in the Journal of the Chemical Society (London) for 1928, page 2437. The necessary α,Ω-dihaloalkanes are well known in the art.

The aromatic mercapto amine starting materials are prepared in well-known methods. A method of wide applicability is that of Allert. He reduces a suitable nitrobenzenesulfonic acid with zinc and hydrochloric acid. The method is described in Berichte der deutschen chemischen Gesellschaft, volume 14, p. 1434 and following (1881). By selection of substituted starting compounds, corresponding substituted aromatic mercapto amines are obtained.

Other methods include those in Organic Synthesis (Reinhold Publishing Corporation, New York), 1957, by Migraichian, volume 1, pages 23 to 25, and the references there cited.

Other methods of preparing mercapto aromatic amines and other amines are set forth in full detail in "Organic Chemistry of Bivalent Sulfur" (Chemical Publishing Company, New York, 1958) by Reid, volume 1, page 396 and following, and especially the references set forth therein.

I claim:
1. The compounds of the formula

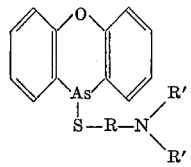

wherein R is a divalent radical selected from the group consisting of alkylene being of from 2 to 12 carbon atoms, alkenylene being of from 4 to 12 carbon atoms, phenylene and substituted phenylene wherein any substituent is selected from the group consisting of alkyl, alkoxy, alkylthio, amino, and halo; and wherein each R' is independently selected from the group consisting of hydrogen and lower alkyl being of from 1 to 4 carbon atoms, and the strong acid salts thereof.

2. 2-(10-phenoxarsinylthio)triethylamine hydrochloride.
3. 2-(10-phenoxarsinylthio)ethylamine hydrochloride.
4. o-(10-phenoxarsinylthio)aniline.
5. p-(10-phenoxarsinylthio)aniline hydrochloride.
6. N-methyl-9-(10-phenoxarsinylthio)nonylamine hydrobromide.
7. 2,3-dichloro-N-ethyl-6-(10-phenoxarsinylthio)aniline.
8. N-butyl-N-isopropyl-4-(10-phenoxarsinylthio)-2-butenylamine.
9. N-isopropyl-4-(10-phenoxarsinylthio)-2-butenylamine, compound (1–1) with 1-butanesulfonic acid.

No references cited.